Patented Aug. 31, 1937

2,091,636

UNITED STATES PATENT OFFICE 2,091,636

PRODUCTION OF TRIMETHYLAMINE

Paul Herold, Werner Wustrow, and Heinrich Wetzel, Leuna, Germany, assignors to I. G. Farbenindustrie Aktiengesellschaft, Frankfort-on-the-Main, Germany No Drawing. Application March 6, 1934, Serial No. 714,268. In Germany March 8, 1933

12 Claims. (Cl. 202—42)

The present invention relates to improvements in the production of trimethylamine.

In the manufacture and production of methylamines by the catalytic reaction of methanol or dimethyl ether with ammonia, primary, secondary and tertiary methylamines are always obtained together. In order to separate these substances from each other, it has proved preferable to separate the trimethylamine, by reason of its abnormal behaviour in boiling, in the form of a very low boiling binary azeotropic mixture with ammonia, the remaining substantially anhydrous mixture of monomethylamine and dimethylamine then being readily separated by distillation.

The working up of the said azeotropic mixture of ammonia and trimethylamine, which has a constant boiling point, for the purpose of recovering the trimethylamine has hitherto only been possible by the troublesome method of conversion into a salt mixture and separation of the same by extraction by means of organic solvents.

We have now found that trimethylamine can be recovered in a simple and economical manner by fractional distillation from azeotropic mixtures of ammonia and trimethylamine by adding thereto a third substance which is capable of forming with ammonia a binary azeotropic mixture the boiling point of which is below that of the azeotropic mixture of ammonia and trimethylamine used as the initial material. The formation of a ternary azeotropic mixture of ammonia, trimethylamine and the added third substance would interfere with carrying out the process and must therefore be avoided by appropriate selection of the added third substance. On the other hand it is not injurious when the additional substance is also capable of forming a binary azeotropic mixture with the trimethylamine.

Contrary to expectation, a large number of substances, even of greatly different chemical nature, fulfills the said conditions. For example, both saturated and unsaturated hydrocarbons and also organic compounds containing oxygen, such as ethers, may be employed.

Especially organic compounds of relatively low boiling point come into question for the purposes of the present invention. In practice, normal butane, iso-butane, normal butylene and iso-butylene as well as dimethyl ether have proved advantageous. They are distinguished by neither forming a ternary azeotropic mixture nor a binary azeotropic mixture with trimethylamine but only a binary azeotropic mixture with ammonia when in the presence of trimethylamine and ammonia.

The addition of the third substance to the mixture of ammonia and trimethylamine from which the latter is to be separated and which need not necessarily be a pure binary azeotropic mixture but, as is usually the case in practice, may contain an excess of ammonia, may be effected before or during the distillation. The distillation itself may be carried out at atmospheric, reduced or increased pressure. It is preferably carried out at somewhat increased pressure corresponding to the vapor pressure of the fractions to be distilled at ordinary temperature, because the separation may then be effected most economically with the employment of ordinary cooling water.

The amount of substance to be added depends on the amount of ammonia to be removed and on the proportions in which it forms an azeotropic mixture with ammonia.

If the boiling point of the added substance in the pure state differs considerably from that of trimethylamine, as for example is the case with dimethyl ether, it is preferable to employ an amount somewhat in excess over that necessary for the distillation of the whole of the ammonia in the form of a binary azeotropic mixture with the additional substance. Thus, after the ammoniacal main fraction has been distilled off, practically all the trimethylamine is directly obtained in a pure form as the distillation residue.

On the other hand, if the additional substance has a boiling point similar to that of pure trimethylamine, as is the case for example with normal butane, it is preferable to work with an amount smaller than that necessary for the complete conversion of all of the ammonia into an azeotropic mixture of normal butane and ammonia. In this manner the retention of any normal butane by the trimethylamine is avoided, which is an advantage because the said two substances are difficult to separate. Accordingly only the greater part of the ammonia passes over in the form of an azeotropic mixture with the normal butane. In the further course of the distillation the remainder of the ammonia passes over in the form of the known azeotropic mixture of ammonia and trimethylamine, which is supplied again to a fresh distillation process. The greater part of the trimethylamine remains behind also in this case in a practically pure form. The normal butane is separated from the distilled mixture of normal butane and ammonia, preferably by the addition of water; it may be employed for a further distillation of the same kind.

When using dimethyl ether such a separation is not possible, but on the other hand it is not advantageous because the distilled mixture of ammonia and dimethyl ether may be supplied as such to the catalytic conversion process of methyl alcohol or dimethyl ether with ammonia for the formation of methylamines. For the said purpose the said mixture may be used exclusively or it may be employed in admixture with fresh ammonia with or without the simultaneous addition of methyl alcohol.

The following examples will further illustrate the nature of this invention, but the invention is not restricted to these examples.

Example 1

68 kilograms of normal butane are added to a mixture of 20 kilograms of trimethylamine and 80 kilograms of ammonia obtained by the distillation of a mixture of methylamine bases and ammonia. The mixture is then fractionally distilled at atmospheric pressure. At the beginning of the distillation a mixture of 80 kilograms of ammonia and 68 kilograms of normal butane passes over at 37° below zero C., while pure trimethylamine remains behind.

Example 2

108 kilograms of dimethyl ether are added to a mixture of 20 kilograms of trimethylamine and 80 kilograms of ammonia obtained by the distillation of a mixture of methylamine bases and ammonia. The mixture is fractionally distilled at atmospheric pressure. At the beginning of the distillation a mixture of 80 kilograms of ammonia and 108 kilograms of dimethyl ether passes over at 37° below zero C., while pure trimethylamine remains behind.

Example 3

100 kilograms of liquid dimethyl ether are added to an anhydrous liquid mixture of 90 kilograms of ammonia and 30 kilograms of trimethylamine, such as is obtainable, for example, as first runnings in the form of an azeotropic mixture by the distillation of a mixture of ammonia and methlyamine bases (which is obtained in the catalytic conversion of methyl alcohol with ammonia in excess).

The mixture is subjected to fractional distillation under its own vapor pressure while cooling with water of ordinary temperature.

Under these conditions, at a constant temperature of 25° C. and under a constant pressure of 11 atmospheres, a mixture passes over which consists of the whole of the added ammonia (89 kilograms), the greater part of the added dimethyl ether (70 kilograms) and only traces of trimethylamine. The pressure then falls to 6 atmospheres and, at the same temperature, the remainder of the dimethyl ether passes over (29 kilograms) in an almost pure condition. There is then a further fall in pressure down to 1.5 atmospheres, and the residue passes over at 25° C., the distillate consisting of 29 kilograms of trimethylamine in the form of a 98 per cent anhydrous base.

Example 4

86 kilograms of liquid isobutane are added to an anhydrous liquid composed of 90 kilograms of ammonia and 30 kilograms of trimethylamine (which mixture may be obtained, for example, as an azeotropic mixture passing over at a constant temperature as the first runnings in the distillation of a mixture of ammonia and methylamine bases resulting from the catalytic conversion of methyl alcohol and/or dimethyl ether with a large excess of ammonia). The mixture obtained is subjected to fractional distillation under its own vapor pressure. At a constant temperature of 25° C. and under a constant pressure of 12 atmospheres a mixture passes over, which is composed of practically the whole of the isobutane (84 kilograms), the major part of the ammonia (70 kilograms) and of only traces of trimethylamine. When the distillation is continued the pressure decreases to 10 atmospheres and at the same temperature the remaining ammonia (15 kilograms) and a small amount of the trimethylamine (5 kilograms) distills over in the form of an azeotropic mixture. The pressure then diminishes to 1.5 atmospheres and, after a small intermediate fraction the residue passes over at 25° C., pure trimethylamine being thus obtained in an amount of 22 kilograms.

The condensed azeotropic mixture of 70 kilograms of ammonia and 84 kilograms of isobutane mentioned above forms two layers in the receiver; it is mixed therein with 210 litres of water while cooling and stirred for a short time. The mixture is then allowed to separate whereupon the isobutane forms an upper layer while the lower layer consists of 25 per cent aqueous ammonia. The latter is withdrawn. The isobutane may be used for further operations.

Example 5

118 kilograms of liquid isobutane are added to an anhydrous liquid composed of 90 kilograms of ammonia and 30 kilograms of trimethylamine, such as is used according to Example 4. The mixture is subjected to fractional distillation under its own vapor pressure while using cooling water of ordinary temperature. At a constant temperature of 25° C. and under a constant pressure of 12 atmospheres a mixture distills over, which consists of practically the whole of the ammonia employed (88 kilograms), the major part of the isobutane (103 kilograms) and traces of trimethlyamine. The pressure then decreases to 2.5 atmospheres. Under this pressure at 25° C. nearly pure isobutane (10 kilograms) passes over. Subsequently the pressure falls to 1.5 atmospheres. After a small intermediate fraction of isobutane and trimethylamine the residue passes over at 25° C., and 26 kilograms of pure trimethylamine are thus obtained.

The azeotropic mixture of ammonia and isobutane referred to above forms two layers after condensation, which are separated in a suitable vessel; the lower one is rich in ammonia and consists of 80 kilograms of ammonia and 7 kilograms of isobutane and the upper one of 8 kilograms of ammonia and 96 kilograms of isobutane. The upper layer is again introduced into the distilling vessel, mixed with a fresh mixture of ammonia and trimethylamine to be separated, for example, composed of 73 kilograms of ammonia and 24 kilograms of trimethylamine, and distillation is again effected in the manner described.

The mixtures of isobutane and ammonia, which are low in isobutane, collected from several operations are stirred for a short time at ordinary temperature with water in a pressure vessel. For example, a mixture of 30 kilograms of isobutane per 300 kilograms of ammonia is stirred with 900 litres of water while cooling intensely. The whole is allowed to separate when an upper layer of isobutane and a lower layer of a 25 per cent aqueous ammonia are formed. The latter is withdrawn and the isobutane is used for further operations.

The mixture rich in ammonia with little isobutane may be used for the production of methylamine bases by catalytic conversion of ammonia and methanol, because the presence of isobutane is not injurious to the said reaction.

*Example 6*

80 kilograms of crude butane (consisting of 40 per cent of isobutane and 60 per cent of normal butane) are added to an anhydrous liquid mixture of 90 kilograms of ammonia and 30 kilograms of trimethylamine, as is used in the foregoing examples. The mixture obtained is subjected to fractional distillation under its own vapor pressure while using cooling water of ordinary temperature. At a constant temperature of 25° C. and under a constant pressure of 12 atmospheres a mixture passes over, which consists practically of the whole of the crude butane employed (77 kilograms) and the major part of the ammonia (83 kilograms) and contains only traces of trimethylamine. The pressure then falls to about 10 atmospheres whereupon the remaining ammonia (5 kilograms) distils together with a small amount of trimethylamine (1.5 kilograms) as an azeotropic mixture. The pressure then decreases to 1.5 atmospheres and after a small intermediate fraction 24 kilograms of pure trimethylamine distil over.

The azeotropic mixture of crude butane and ammonia, which forms two layers in the receiver may be worked up in the manner described in Example 5.

What we claim is:—

1. The process of recovering trimethylamine by distillation of an azeotropic mixture of ammonia and trimethylamine, which comprises adding to the said mixture a butane, and subjecting the mixture obtained to fractional distillation.

2. The process of recovering trimethylamine from a mixture of ammonia and trimethylamine, which comprises adding to the said mixture an ether, and subjecting the mixture obtained to fractional distillation.

3. The process of recovering trimethylamine from a mixture of ammonia and trimethylamine, which comprises adding dimethyl ether to the said mixture, and subjecting the mixture obtained to fractional distillation.

4. The process of recovering trimethylamine by distillation of an azeotropic mixture of ammonia and trimethylamine, which comprises adding to the said mixture a butane, and subjecting the mixture obtained to fractional distillation under superatmospheric pressure.

5. The process of separating mixtures of ammonia and trimethylamine which comprises adding dimethyl ether to the mixture and fractionally distilling.

6. The process of separating mixtures of ammonia and trimethylamine which comprises adding dimethyl ether to the mixture and fractionally distilling under superatmospheric pressure.

7. The process of separating mixtures of ammonia and trimethylamine which comprises adding sufficient dimethylether to the mixture to form a constant boiling mixture with the ammonia and fractionally distilling.

8. The process of separating mixtures of ammonia and trimethylamine which comprises adding sufficient dimethylether to the mixture to form a constant boiling mixture with the ammonia and fractionally distilling under superatmospheric pressure.

9. In the process of manufacturing methylamines the step of adding to the fraction containing a constant boiling mixture of ammonia and trimethylamine, dimethylether, fractionally distilling under pressure to take off a constant boiling mixture of dimethylether and ammonia and returning the dimethylether and ammonia to the starting materials for conversion to methylamines.

10. The process of recovering trimethylamine from a mixture of ammonia and trimethylamine, which comprises adding to the said mixture a substance not chemically reacting therewith in the process, capable of forming with ammonia a binary azeotropic mixture having a lower boiling point than the azeotropic ammonia-trimethylamine mixture, but incapable of forming a ternary azeotropic mixture with ammonia and trimethylamine, the said substance being selected from the group consisting of the aliphatic hydrocarbons containing 4 carbon atoms in the molecule and ethers, and subjecting the mixture obtained to fractional distillation.

11. The process of recovering trimethylamine from an azeotropic mixture of ammonia and trimethylamine, which comprises adding to the said mixture a substance not chemically reacting therewith in the process, capable of forming with ammonia a binary azeotropic mixture having a lower boiling point than the azeotropic ammonia trimethylamine mixture, but incapable of forming a ternary azeotropic mixture with ammonia and trimethylamine, the said substance being selected from the group consisting of the aliphatic hydrocarbons containing four carbon atoms in the molecule and ethers, and subjecting the mixture obtained to fractional distillation under elevated pressure.

12. The process of recovering trimethylamine from an azeotropic mixture of ammonia and trimethylamine, which comprises adding to the said mixture a substance not chemically reacting therewith in the process, capable of forming with ammonia a binary azeotropic mixture having a lower boiling point than the azeotropic ammonia trimethylamine mixture, but incapable of forming a ternary azeotropic mixture with ammonia and trimethylamine, the said substance being selected from the group consisting of the aliphatic hydrocarbons containing four carbon atoms in the molecule and ethers, and subjecting the mixture obtained to fractional distillation under its own vapor pressure at ordinary temperature.

PAUL HEROLD.
WERNER WUSTROW.
HEINRICH WETZEL.